United States Patent
Watanabe et al.

(10) Patent No.: US 11,485,430 B2
(45) Date of Patent: Nov. 1, 2022

(54) AIRFLOW ADJUSTING APPARATUS

(71) Applicant: SUBARU CORPORATION, Tokyo (JP)

(72) Inventors: Naoto Watanabe, Tokyo (JP); Yusaku Dogahira, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 141 days.

(21) Appl. No.: 17/001,879

(22) Filed: Aug. 25, 2020

(65) Prior Publication Data
US 2021/0094632 A1    Apr. 1, 2021

(30) Foreign Application Priority Data
Sep. 30, 2019    (JP) .............................. JP2019-178524

(51) Int. Cl.
*B62D 35/00*    (2006.01)
*B62D 37/02*    (2006.01)
*B62D 25/10*    (2006.01)
*F15D 1/00*    (2006.01)

(52) U.S. Cl.
CPC ............ *B62D 37/02* (2013.01); *B62D 25/10* (2013.01); *B62D 35/005* (2013.01); *F15D 1/0075* (2013.01)

(58) Field of Classification Search
CPC .......... B62D 35/00; B62D 35/001–008; B62D 35/02; B62D 37/02; B62D 25/10; F15D 1/0075
See application file for complete search history.

(56) References Cited

U.S. PATENT DOCUMENTS

| | | | | |
|---|---|---|---|---|
| 3,529,862 | A * | 9/1970 | Jousserandot | B62D 35/007 296/180.1 |
| 4,384,630 | A * | 5/1983 | Steiner | B62D 35/00 296/180.1 |
| 5,908,217 | A * | 6/1999 | Englar | B62D 37/02 296/180.1 |
| 7,380,756 | B1 * | 6/2008 | Enloe | B64C 23/005 244/175 |
| 9,399,493 | B1 * | 7/2016 | Milde, Jr. | B62D 25/12 |
| 10,336,270 | B2 * | 7/2019 | Yamada | B62D 35/00 |
| 10,495,121 | B2 * | 12/2019 | Smullin | G01P 5/02 |
| 2007/0089795 | A1 * | 4/2007 | Jacob | B64C 23/005 137/827 |

(Continued)

FOREIGN PATENT DOCUMENTS

| | | |
|---|---|---|
| JP | 2004-345562 A | 12/2004 |
| WO | 2011/024736 A1 | 3/2011 |

*Primary Examiner* — Gregory A Blankenship
(74) *Attorney, Agent, or Firm* — Troutman Pepper Hamilton Sanders LLP (57) ABSTRACT

An airflow adjusting apparatus includes an airflow generator, a state detector, and a controller. The airflow generator is configured to generate a control airflow to cause the control airflow to join an around-vehicle airflow formed around a vehicle body of a traveling vehicle. The airflow generator is configured to vary a flow direction of the control airflow with respect to a surface of the vehicle body. The state detector is configured to detect a state of the around-vehicle airflow. The controller is configured to vary the flow direction of the control airflow on the basis of the state of the around-vehicle airflow detected by the state detector.

11 Claims, 7 Drawing Sheets

(56) References Cited

U.S. PATENT DOCUMENTS

| | | | |
|---|---|---|---|
| 2008/0122252 A1* | 5/2008 | Corke | B62D 35/001 296/180.1 |
| 2009/0212164 A1* | 8/2009 | Osborne | B64C 23/005 244/205 |
| 2010/0072777 A1* | 3/2010 | Ramsay | B62D 35/00 296/180.1 |
| 2010/0072778 A1* | 3/2010 | Ramsay | B62D 35/00 296/180.1 |
| 2012/0152198 A1 | 6/2012 | Kim et al. | |
| 2012/0292122 A1* | 11/2012 | Verbrugge | B60K 11/085 296/193.11 |
| 2013/0168999 A1* | 7/2013 | Hitchcock | B62D 35/00 296/180.1 |
| 2017/0297634 A1* | 10/2017 | Han | B62D 35/02 |
| 2019/0178268 A1* | 6/2019 | Shah | B62D 35/00 |
| 2019/0193843 A1* | 6/2019 | Kikuchi | B64C 9/18 |
| 2019/0202505 A1* | 7/2019 | Elogab | F15D 1/12 |
| 2019/0342985 A1* | 11/2019 | Dadheech | B62D 35/00 |
| 2020/0180708 A1* | 6/2020 | Khalighi | B62D 35/00 |
| 2020/0180711 A1* | 6/2020 | Han | B62D 35/007 |
| 2021/0094630 A1* | 4/2021 | Watanabe | F15D 1/0075 |
| 2021/0094631 A1* | 4/2021 | Watanabe | B62D 37/02 |
| 2021/0094632 A1* | 4/2021 | Watanabe | B62D 25/10 |
| 2021/0094633 A1* | 4/2021 | Watanabe | B62D 25/105 |
| 2021/0129924 A1* | 5/2021 | Elogab | B62D 35/02 |
| 2021/0300485 A1* | 9/2021 | Watanabe | H05H 1/2439 |
| 2021/0355923 A1* | 11/2021 | Niwa | G03B 17/08 |
| 2021/0403100 A1* | 12/2021 | Hussein | B62D 35/007 |
| 2022/0033009 A1* | 2/2022 | Watanabe | B62D 35/02 |
| 2022/0033010 A1* | 2/2022 | Watanabe | B62D 37/02 |
| 2022/0033011 A1* | 2/2022 | Watanabe | B62D 35/02 |
| 2022/0033012 A1* | 2/2022 | Watanabe | F15D 1/0075 |
| 2022/0033013 A1* | 2/2022 | Watanabe | H05H 1/2439 |
| 2022/0033014 A1* | 2/2022 | Watanabe | B62D 35/02 |

\* cited by examiner

AIRFLOW ADJUSTING APPARATUS

CROSS-REFERENCE TO RELATED APPLICATIONS

The present application claims priority from Japanese Patent Application No. 2019-178524 filed on Sep. 30, 2019, the entire contents of which are hereby incorporated by reference.

BACKGROUND

The technology relates to an airflow adjusting apparatus that adjusts an airflow generated around a vehicle body of a traveling vehicle.

Traveling wind may be generated against a vehicle such as an automobile while the vehicle is traveling. Such traveling wind can cause air resistance or drag on the vehicle. The traveling wind can cause a turbulent flow accompanied by a vortex flow around a vehicle body, thereby increasing the air resistance and deteriorating aerodynamic noise, that is, so-called wind noise, and aerodynamic vibration. International Publication WO2011/024736A1 discloses a vehicle airflow adjusting apparatus including a plasma actuator that is attached to a surface of a vehicle body. The plasma actuator includes two or more electrodes that are disposed with a dielectric interposed in between. The plasma actuator uses plasma generated upon application of a high voltage to the electrodes to induce an airflow. Such an airflow may be sometimes referred to as ion wind or an induced airflow.

SUMMARY

An aspect of the technology provides an airflow adjusting apparatus that includes an airflow generator, a state detector, and a controller. The airflow generator is configured to generate a control airflow to cause the control airflow to join an around-vehicle airflow formed around a vehicle body of a traveling vehicle. The airflow generator is configured to vary a flow direction of the control airflow with respect to a surface of the vehicle body. The state detector is configured to detect a state of the around-vehicle airflow. The controller is configured to vary the flow direction of the control airflow on the basis of the state of the around-vehicle airflow detected by the state detector.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

First Example Embodiment

Figure 1:
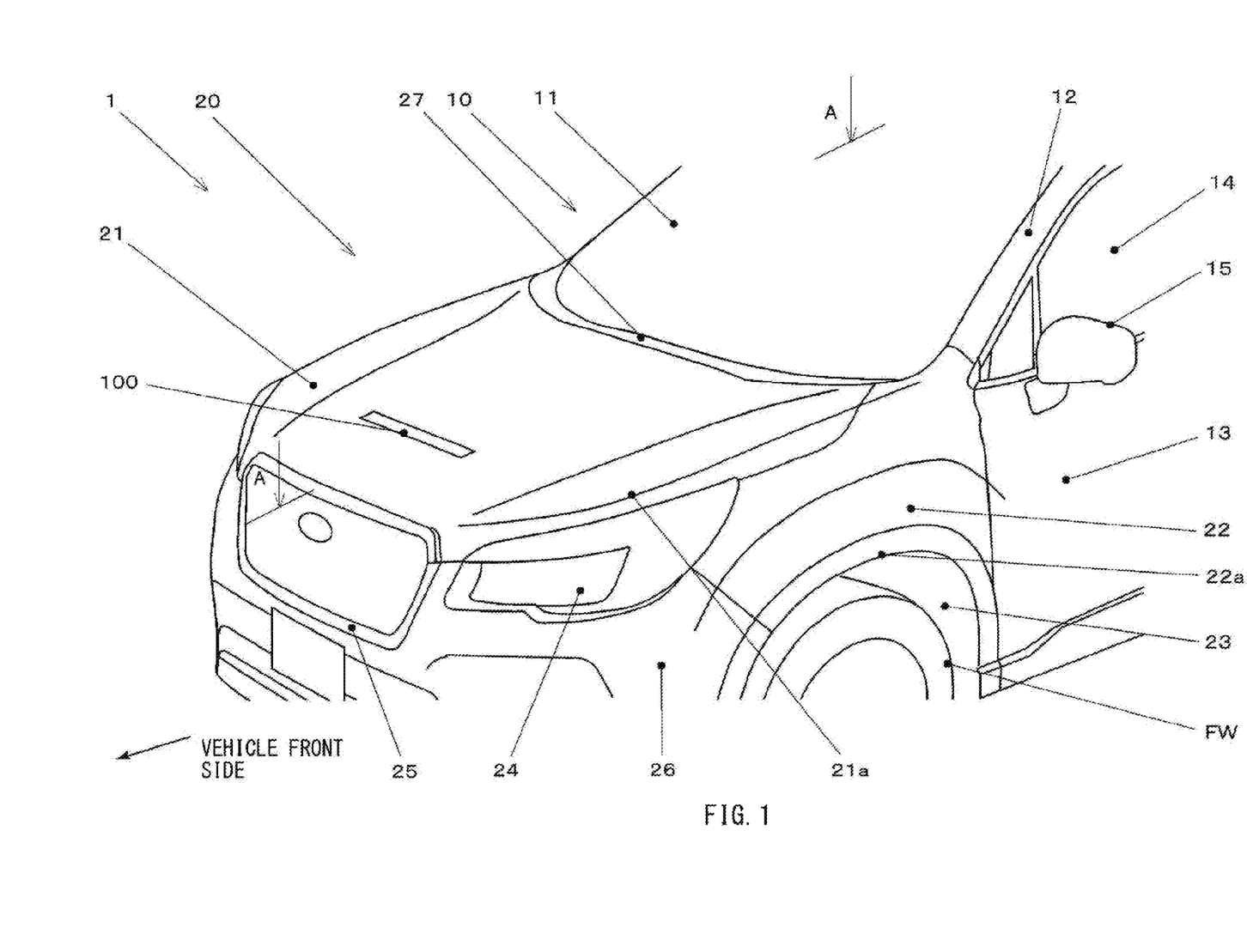
FIG. 1 is an external perspective view of an example of a front portion of a vehicle that includes an airflow adjusting apparatus according to one example embodiment of the technology.

FIG. 1 is an external perspective view of a front portion of a vehicle that includes an airflow adjusting apparatus according to a first example embodiment of the technology. The airflow adjusting apparatus according to the first example embodiment may be provided in a vehicle such as a passenger car, for example. The airflow adjusting apparatus may adjust an airflow that is generated around a vehicle body of the traveling vehicle and relative to the vehicle. In the first example embodiment, the airflow adjusting apparatus may use a plasma actuator 100, which will be described later, to generate a control airflow, thereby adjusting an airflow around the vehicle body. The control airflow may be sometimes referred to as ion wind or an induced airflow.

A vehicle 1 may be, for example but not limited to, a two-box passenger car including a cabin 10 and an engine compartment 20. The cabin 10 and the engine compartment 20 may configure a main part of the vehicle body in the first example embodiment. The cabin 10 may have a space that accommodates an occupant. The cabin 10 may include, for example but not limited to, a windshield 11, A-pillars 12, front doors 13, front door glasses 14, and door mirrors 15.

The windshield 11, which is sometimes referred to as a "front window", may be provided on an upper half of a front portion of the cabin 10. The windshield 11 may be so tilted rearward with respect to a vertical direction that an upper end of the windshield 11 is positioned on vehicle rear side with respect to a lower end of the windshield 11. The windshield 11 may be so curved that a middle portion of the windshield 11 in a vehicle widthwise direction protrudes toward vehicle front side.

The A-pillars 12 may each be a pillar part that is disposed along corresponding one of left and right ends of the windshield 11.

The front doors 13 may each be a door-shaped part that seals the space in the cabin 10 from its side. The front doors 13 may each be provided on a side of a front portion of the cabin 10. The front doors 13 may each include a hinge at its front end, and may be attached to the main part of the vehicle body by means of the hinge. The front doors 13 are each thereby allowed to swing to be open or closed when an occupant gets in or gets out of the vehicle.

The front door glasses 14 may each be a glass member that is provided in an upper portion of corresponding one of the front doors 13. The front door glasses 14 may each move upward and downward. When the front door glass 14 is closed, that is, when the front door glass 14 has moved to an uppermost position, a front end of the front door glass 14 may be disposed along a rear portion of corresponding one of the A-pillars 12.

The door mirrors 15 may each be a side-view mirror that protrudes from an upper portion in the vicinity of a front end of corresponding one of the front doors 13 toward the outside in the vehicle widthwise direction.

The engine compartment 20 may contain, for example but not limited to, an unillustrated engine which is a traveling power source of the vehicle. The engine compartment 20 may extend from a lower half of the front end of the cabin 10 toward the vehicle front side. The lower half of the front end of the cabin 10 may be, in other words, a region that is positioned below the lower end of the windshield 11 and corresponds to a bulkhead.

The engine compartment 20 may include, for example but not limited to, a bonnet 21, which may be sometimes referred to as an "engine hood" or an "engine lid", front fenders 22, wheel houses 23, front combination lamps 24, a front grille 25, a front bumper 26, and a cowl 27.

The bonnet 21 may be provided in an upper portion of the engine compartment 20 in an openable and closable manner. The bonnet 21 may be a door-shaped part that seals a portion containing the engine from upper side. The bonnet 21 may so have a curved surface that a middle portion of the bonnet 21 in a vehicle front-rear direction protrudes upward. The curved surface may have a curvature that is greater in the vicinity of the front end of the bonnet 21. The bonnet 21 may have ends in the vehicle widthwise direction that are each bent downward in a region outside corresponding one of ridge lines 21a to be coupled to a surface portion of corresponding one of the front fenders 22. The ridge lines 21a may each be a portion at which the protruding curved surface has a locally-greater curvature. The ridge lines 21a may each extend in the vehicle front-rear direction at corresponding one of side ends of the bonnet 21.

The front fenders 22 may each be an exterior member included in a side surface portion of the engine compartment 20. The front fenders 22 may each have a rear edge that extends along a front edge of corresponding one of the front doors 13. Provided below the respective front fenders 22 may be arc-shaped wheel arches 22a. The wheel arches 22a may each serve as an upper edge of corresponding one of the wheel houses 23 in a side-view of the vehicle 1.

The wheel houses 23 may each contain corresponding one of front wheels FW of the vehicle 1. The wheel houses 23 may each be provided on inner side of corresponding one of the wheel arches 22a, at a lower-side portion of the engine compartment 20. The wheel houses 23 may each be a space that is open outward with respect to the vehicle widthwise direction.

The front combination lamps 24 may each include a head lamp and other lamps contained in a single housing to be unitized. The headlamp may have a lighting direction that is set to the vehicle front side. The other lamps may include, for example but not limited to, a turn signal lamp, a position lamp, and a daytime running lamp. The front combination lamps 24 may be provided in a pair. The two front combination lamps 24 may each be provided below the vicinity of corresponding one of left-front end and right-front end of the bonnet 21, and may be separated away from each other in the vehicle widthwise direction.

The front grille 25 may be an exterior member that is provided at an opening through which air is introduced into a component such as an unillustrated radiator core or a condenser of an air conditioner. The front grille 25 may be disposed between the right and left front combination lamps 24.

The front bumper 26 may be an exterior member included in the front end of the vehicle body, and may be provided below the front combination lamps 24 and the front grille 25. The front bumper 26 may have right and left side ends that each extend below a front portion of corresponding one of the front fenders 22 and come into contact with a front portion of corresponding one of the wheel houses 23.

The cowl 27 may be a region provided with an unillustrated front wiper device and an airbag device directed to protection of a pedestrian. The front wiper device may wipe the windshield 11. The cowl 27 may be disposed between a rear edge of the bonnet 21 and the lower end or the front end of the windshield 11. The cowl 27 may have a tray-like shape having a depression downward with respect to the surface of the bonnet 21.

The bonnet 21 may be provided with the plasma actuator 100. In one embodiment, the plasma actuator 100 may serve as an "airflow generator". The plasma actuator 100 may be provided in the middle of the front portion of the bonnet 21 in the vehicle widthwise direction. The plasma actuator 100 may generate a control airflow Fcnt to cause the control airflow Fcnt to join an airflow W around the vehicle body of the vehicle 1 as illustrated, for example, in FIGS. 6 and 7. According to the first example embodiment, a flow direction of the control airflow Fcnt may be varied to any angle θ that is formed with respect to the surface of the bonnet 21 in a direction from the vehicle rear side toward vehicle upper side, that is, the angle θ of a streamline along the flow direction with respect to the surface of the bonnet 21. The flow direction of the control airflow Fcnt may be, in other words, an approach angle of the control airflow Fcnt with respect to the airflow W.

Figure 2:
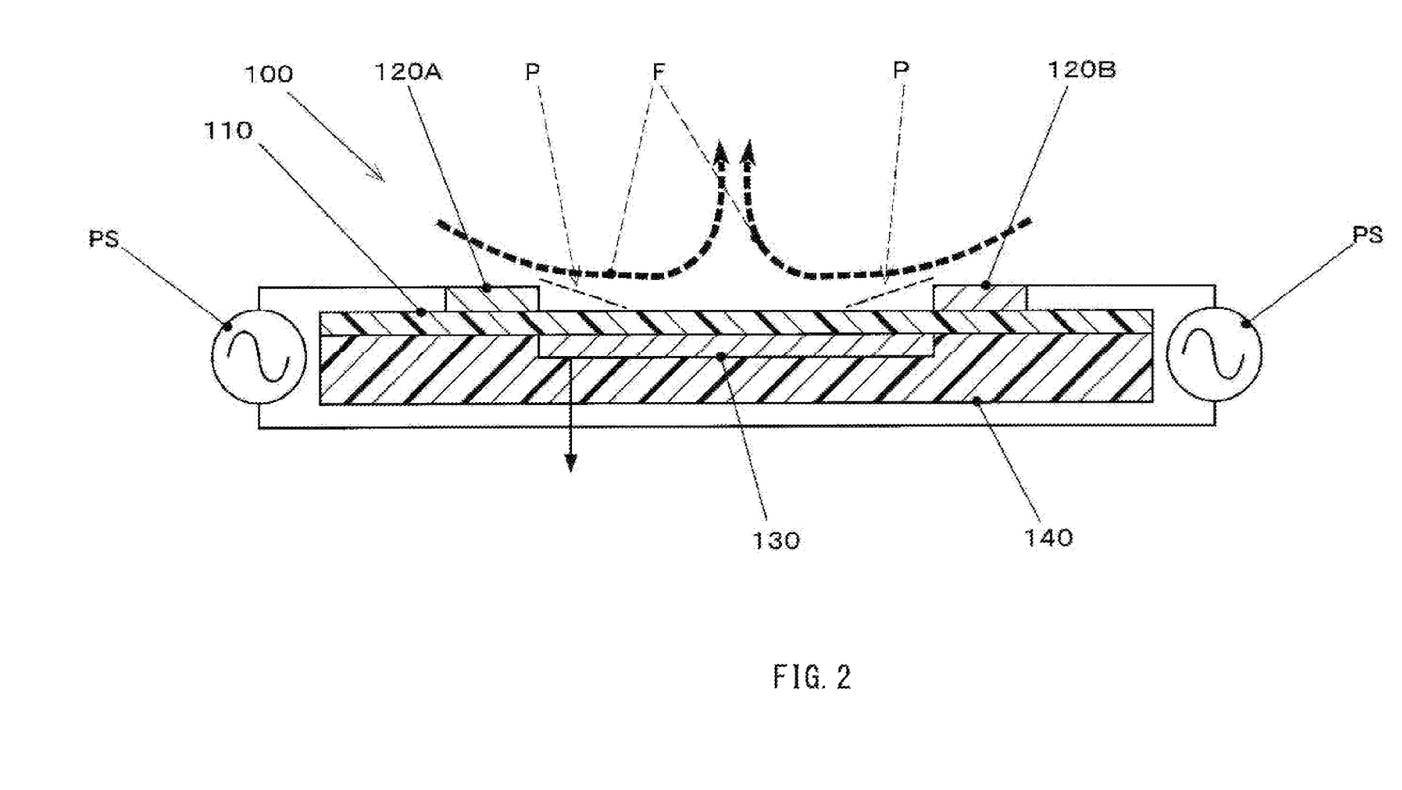
FIG. 2 is a schematic cross-sectional view of an example of a three-electrode plasma actuator to be included in the airflow adjusting apparatus.

FIG. 2 is a schematic cross-sectional view of the three-electrode plasma actuator 100 included in the airflow adjusting apparatus according to the first example embodiment of the technology.

The three-electrode plasma actuator 100 may include, for example but not limited to, a dielectric 110, upper electrodes 120, that is, an upper electrode 120A and an upper electrode 120B, a lower electrode 130, and an insulator 140. In one embodiment, the dielectric 110 may serve as a "dielectric", the upper electrode 120A may serve as a "first upper electrode", the upper electrode 120B may serve as a "second upper electrode", and the lower electrode 130 may serve as a "lower electrode".

The dielectric 110 may be a sheet-shaped member including a material such as fluorocarbon resin, for example. Non-limiting examples of the fluorocarbon resin may include polytetrafluoroethylene.

The upper electrodes 120A and 120B and the lower electrode 130 may each include a thin-film-shaped electrically-conductive member including a material such as metal, for example. Non-limiting examples of the metal may include copper. The upper electrodes 120A and 102B may each be provided on an outer surface side of the dielectric 110. The outer surface side of the dielectric 110 refers to a side that is exposed to the outside when the plasma actuator 100 is attached to the vehicle body. The lower electrode 130 may be provided on an inner surface side of the dielectric 110 that is opposite to the outer surface side of the dielectric 110. According to the first example embodiment, the paired upper electrodes 120A and 120B that are thus disposed along the surface of the dielectric 110 on the outer surface side of the dielectric 110. Further, such upper electrodes 120A and 120B may be so disposed on both sides of the lower electrode 130 that the upper electrodes 120A and 120B are symmetrical with respect to the lower electrode 130. In other words, a pair of plasma dischargers that share the same dielectric 110 and the same lower electrode 130 may be integrated in the single plasma actuator 100, according to the first example embodiment.

Power supplies PS may each be provided for corresponding one of the paired upper electrodes 120A and 120B, and may be configured to apply a voltage to the corresponding one of the upper electrodes 120A and 120B. The power supplies PS may be configured to perform the voltage application independently of each other. In one embodiment, the power supplies PS may serve as a "power supply".

The insulator 140 may be a sheet-shaped member serving as a base of the plasma actuator 100. The insulator 140 may be so disposed on the inner surface side of the dielectric 110 as to cover an inner surface of the dielectric 110 and the lower electrode 130.

Application, by means of the power supply PS, of an alternating-current voltage having a predetermined waveform between the upper electrode 120A and the lower electrode 130 of the plasma actuator 100 and application, by means of the power supply PS, of an alternating-current voltage having a predetermined waveform between the upper electrode 120B and the lower electrode 130 of the plasma actuator 100 allow plasma P to be generated between the upper electrode 120A and the lower electrode 130 and also between the upper electrode 120B and the lower electrode 130. It may be necessary that the applied voltage be high enough to cause electrical breakdown to generate the plasma P. An allowable applied voltage range may be from 1 kV to 10 kV, for example. In addition, a frequency range of the applied voltage may be from 1 kHz to 10 kHz, for example. The plasma P may allow air on the outer surface side of the plasma actuator 100 to be drawn in to provoke a wall-jet airflow F.

FIG. 2 illustrates a case where the plasma P provokes the airflows F that flow in a direction from the upper electrode 120A toward the lower electrode 130 and a direction from the upper electrode 120B toward the lower electrode 130. However, the plasma actuator 100 may control the waveform of the applied alternating-current voltage to thereby reverse the directions of provoking the airflows F.

According to the first example embodiment, the three-electrode plasma actuator 100 including the paired upper electrodes 120A and 120B may use the plasma P formed between the upper electrode 120A and the lower electrode 130 and the plasma P formed between the upper electrode 120B and the lower electrode 130 to generate the airflows F that are opposed to each other. The airflows F may be caused to crash each other to join each other, and the joined airflows F may be deflected. This may generate an airflow in a direction away from a principal plane of the plasma actuator 100, for example, in direction of a normal to the outer surface of the dielectric 110. According to the first example embodiment, the airflow after joining of the airflows F may be referred to as the "control airflow" Fcnt, which is adopted to control an airflow around the vehicle body, that is, to adjust the airflow around the vehicle body.

The three-electrode plasma actuator 100 may be configured to generate the control airflow Fcnt that flows in a direction having an acute angle with respect to the principal plane of the plasma actuator 100 by causing an output from the plasma discharger on the vehicle front side to be greater than an output from the plasma discharger on the vehicle rear side. Further, the three-electrode plasma actuator 100 may also be configured to generate the control airflow Fcnt that flows along the principal plane of the plasma actuator 100 by applying a voltage only to the upper electrode 120 in one of the plasma dischargers, that is, only to the upper electrode 120A or the upper electrode 120B. Further, the three-electrode plasma actuator 100 may also be configured to vary the flow direction of the control airflow Fcnt by controlling a factor such as the voltages applied to the respective upper electrodes 120A and 120B.

The airflow adjusting apparatus according to the first example embodiment may include a control system described below. The airflow adjusting apparatus may thereby supply driving electric power to the three-electrode plasma actuator 100 to generate, with respect to the vehicle body, the control airflow Fcnt that flows outward from the surface of the vehicle body, thereby adjusting the airflow W that flows on the surface of the vehicle body, for example, the front portion of the vehicle body. The airflow W may be a turbulent flow accompanied by a vortex flow, for example.

Figure 3:
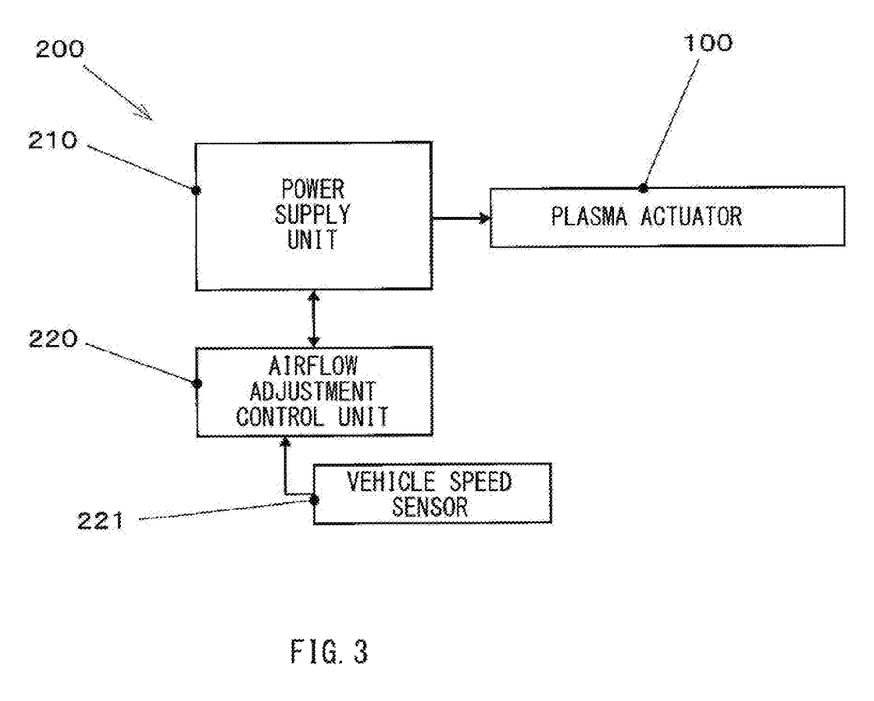
FIG. 3 is a block diagram illustrating an example of a configuration of a control system of the plasma actuator.

FIG. 3 is a block diagram illustrating a configuration of a control system 200 of the plasma actuator 100 in the airflow adjusting apparatus according to the first example embodiment of the technology. In one embodiment, the control system 200 may serve as a "controller".

The control system 200 may include a power supply unit 210 and an airflow adjustment control unit 220.

The power supply unit 210 may include the unitized power supplies PS that perform supply of electric power between the upper electrode 120A and the lower electrode 130 of the plasma actuator 100 and supply of electric power between the upper electrode 120B and the lower electrode 130 of the plasma actuator 100 independently of each other.

The airflow adjustment control unit 220 may give the power supply unit 210 an instruction based on a state of the airflow W around the vehicle body to thereby control activating and deactivating of the plasma actuator 100. In a case of activating the plasma actuator 100, the airflow adjustment control unit 220 may control intensity and the flow direction of the control airflow Fcnt.

The power supply unit 210 and the airflow adjustment control unit 220 may each include, for example but not limited to, an information processor such as a central processing unit (CPU), a storage device such as a random-access memory (RAM) or a read-only memory (ROM), and an input-output interface. Such components may be coupled to each other via a component such as a bus, which may allow such components to communicate with each other.

According to the first example embodiment, a vehicle speed sensor 221 may be provided that detects a traveling speed of the vehicle 1 as an index that represents the state of the airflow W around the vehicle body. The traveling speed of the vehicle 1 is hereinafter simply referred to as a "vehicle speed". The airflow adjustment control unit 220 may be coupled to the vehicle speed sensor 221, and may be configured to receive a signal indicating the detected vehicle speed from the vehicle speed sensor 221. In one embodiment, the vehicle speed sensor 221 may serve as a "state detector".

According to the first example embodiment, the airflow adjustment control unit 220 may perform control of varying the flow direction of the control airflow Fcnt with respect to the surface of the vehicle body, that is, the surface of the bonnet 21, in accordance with a decrease in the vehicle speed. In one specific but non-limiting example, the airflow adjustment control unit 220 may so control the plasma actuator 100 via the power supply unit 210 that a jet angle θ0 increases in accordance with the decrease in the vehicle speed. In other words, the airflow adjustment control unit 220 may so control the plasma actuator 100 via the power supply unit 210 that a speed component, of the control airflow Fcnt, in a direction away from the surface of the vehicle body increases. The jet angle θ, for example, illustrated in FIGS. 6 and 7 may be that of the control airflow F with respect to the surface of the vehicle body, which may represent the flow direction of the control airflow Fcnt.

A so-called vortex generator including a part such as a protrusion can achieve a certain effect in control of a vortex generated downstream of the vortex generator. However, the vortex generator itself can be one cause of generating resistance. In addition, it is difficult to achieve a favorable flow adjustment effect unless a limited airflow condition is satisfied. In contrast, the plasma actuator may suppress a disadvantageous increase in resistance, unlike the vortex generator. However, in general, a direction of an airflow that the plasma actuator generates can be limited to a certain direction. Therefore, it is not always possible to achieve an airflow adjustment effect favorable for a state of an airflow around the vehicle body. For example, in a case where the plasma actuator is provided on the surface of the vehicle body, it is difficult to cope with: a place where an airflow has separated due to a factor such as variation in vehicle speed; variation in the state of such separation of the airflow; or any other issue. Such issues are addressed in the first example embodiment.

Example workings and example effects obtained by the airflow adjusting apparatus or the plasma actuator 100 according to the first example embodiment are described below in comparison with a comparative example.

With regard to the comparative example, components that are the same or correspond to the respective components described in the first example embodiment of the technology are denoted with reference signs same as those used in the first example embodiment, and description thereof will be omitted. In the description below, points in which the comparative example is different from the first example embodiment will be mainly described. The comparative example involves a vehicle corresponding to the vehicle 1 according to the first example embodiment with the airflow adjusting apparatus including the plasma actuator 100 being removed.

Figure 4:
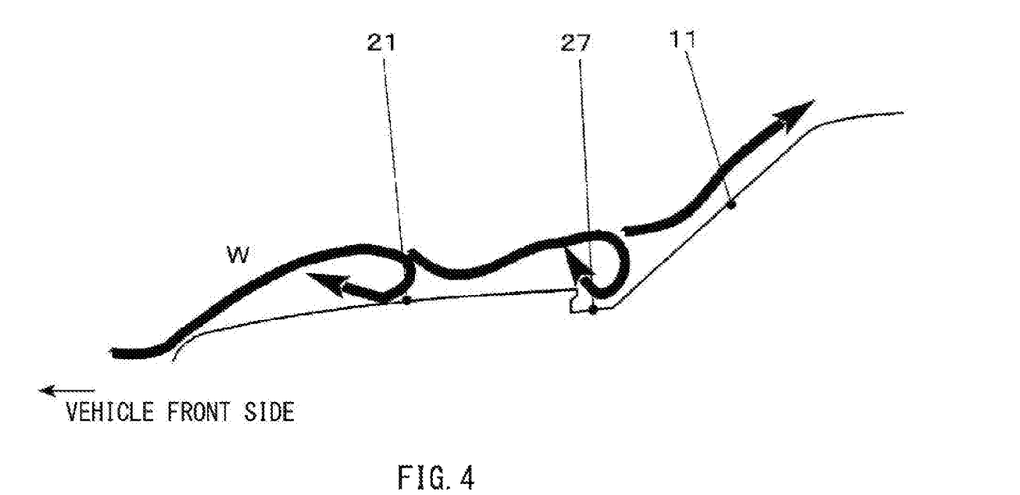
FIG. 4 is a diagram schematically illustrating airflow behavior above a bonnet according to a comparative example in a case where a vehicle is traveling at a low speed.
Figure 5:
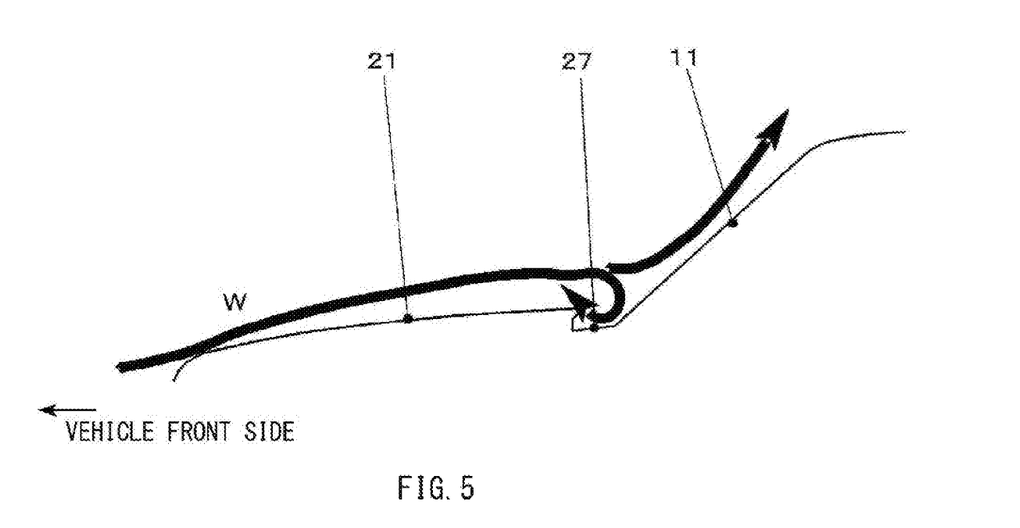
FIG. 5 is a diagram schematically illustrating airflow behavior above the bonnet according to the comparative example in a case where the vehicle is traveling at a high speed.

FIG. 4 and FIG. 5 each schematically illustrate airflow behavior above a bonnet according to the comparative example. FIG. 4 illustrates a low-speed state where the vehicle is traveling at a low speed, for example, at a vehicle speed of 40 km/h. FIG. 5 illustrates a high-speed state where the vehicle is traveling at a high speed, for example, at a vehicle speed of 160 km/h. FIG. 4 and FIG. 5 each illustrate a cross-section corresponding to a cross-section taken along a line A-A of FIG. 1. This is similarly applicable to FIGS. 6, 7, 9, and 10.

In the low-speed state illustrated in FIG. 4, it is easier for the airflow W to separate from the surface of the vehicle body around the vehicle body. The airflow W separated from the surface of the vehicle body in the vicinity of the front end of the bonnet 21 may be attached again to the surface of the bonnet 21 on the rear side of the separation point. Further, the airflow W may become a turbulent flow accompanied by a vortex flow to flow toward the vehicle rear side. Further, a portion of the airflow W that has become the turbulent flow may enter the cowl 27, and the portion entering the cowl 27 may newly generate a turbulent flow inside the cowl 27.

In the high-speed state illustrated in FIG. 5, it is more difficult for the airflow W around the vehicle body to separate from the surface of the vehicle body in comparison with the low-speed state. The airflow W in the high-speed state may flow along the bonnet 21 with a laminar flow being substantially maintained. However, after the airflow W passes the rear end of the bonnet 21, a portion of the airflow W may get caught in the cowl 27 to generate a turbulent flow inside the cowl 27.

Figure 6:
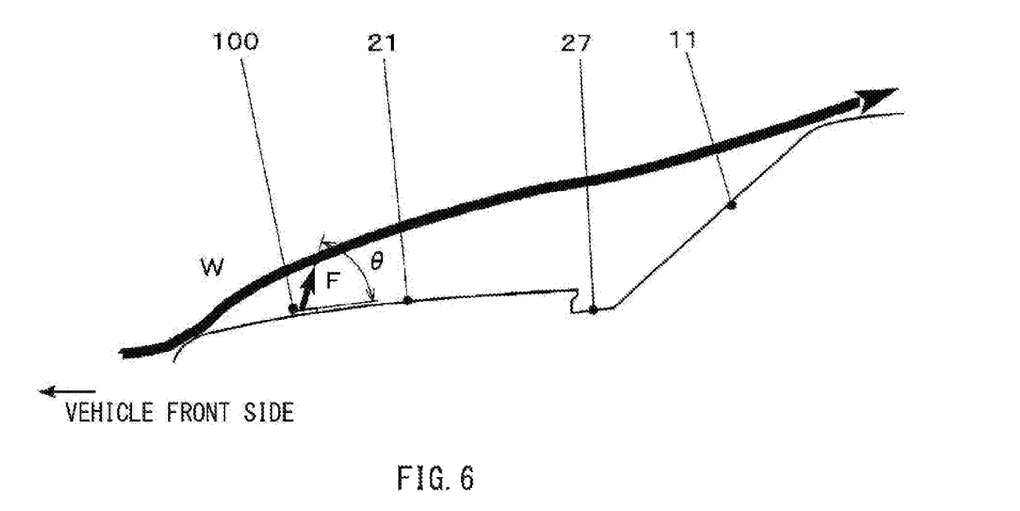
FIG. 6 is a diagram schematically illustrating an example of airflow behavior above a bonnet according to one example embodiment of the technology in a case where the vehicle is traveling at a low speed.
Figure 7:
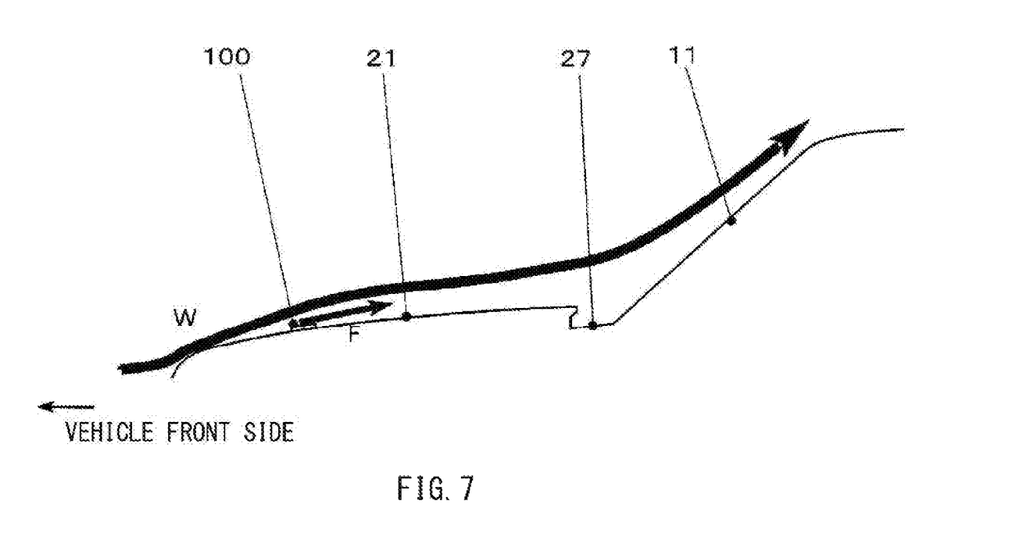
FIG. 7 is a diagram schematically illustrating an example of airflow behavior above the bonnet according to one example embodiment of the technology in a case where the vehicle is traveling at a high speed.

FIG. 6 and FIG. 7 each schematically illustrate airflow behavior above the bonnet 21 according to the first example embodiment of the technology. FIG. 6 illustrates a low-speed state where the vehicle is traveling at a low speed, for example, at a vehicle speed of 40 km/h. FIG. 7 illustrates a high-speed state where the vehicle is traveling at a high speed, for example, at a vehicle speed of 160 km/h.

In the low-speed state illustrated in FIG. 6, the plasma actuator 100 may generate the control airflow Fcnt that flows toward a vehicle upper-rear side of the plasma actuator 100, that is, in a direction away from the surface of the vehicle body. The control airflow Fcnt may flow in a direction tilted with respect to the surface of the vehicle body. This blows upward the airflow W separated from the surface of the vicinity of the front end of the bonnet 21 by means of the control airflow Fcnt to thereby suppress reattachment of the airflow W to the surface of the bonnet 21.

According to the first example embodiment, the angle θ between a direction along the surface of the vehicle body toward the vehicle rear side and the flow direction of the control airflow Fcnt, that is, the jet angle θ of the control airflow Fcnt, may be so varied as to increase in accordance with a decrease in the vehicle speed.

The airflow W that has been blown upward by means of the control airflow Fcnt may flow above the cowl 27 without being reattached to the surface of the bonnet 21. The airflow W may further flow above the windshield 11 without generating an excessive amount of a turbulent flow, and flow toward the vehicle rear side. This makes it possible to suppress generation of the turbulent flow, and also makes it possible to provide a smooth path of traveling wind with reduced air resistance similar to that in a case where the lower end of the windshield 11 is moved toward the vehicle front side, that is, a case where the lower end of the windshield 11 is moved to the vicinity of the front end of the bonnet 21 with the position of the upper end of the windshield 11 being unchanged.

In the high-speed state illustrated in FIG. 7, the plasma actuator 100 may generate the control airflow Fcnt that flows toward the vehicle rear side of the plasma actuator 100 along the surface of the vehicle body. Such a control airflow Fcnt may accelerate the airflow W that flows along the surface of the vehicle body with a laminar flow being substantially maintained but has not been greatly separated from the surface of the vehicle body. The airflow W may be thereby caused to flow from the rear end of the bonnet 21 to above the surface of the windshield 11 while maintaining its course. This makes it possible to prevent the airflow W from getting caught in the cowl 27 and thereby suppress generation of a turbulent flow inside the cowl 27.

As described above, the following effects are achieved according to the first example embodiment of the technology.
(1) The flow direction of the control airflow Fcnt generated by the plasma actuator 100 may be varied in accordance with variation in the traveling speed of the vehicle 1, that is, variation in the state of the airflow W generated around the vehicle body of the traveling vehicle 1. This allows the airflow W to be guided in a direction more appropriate for the corresponding state by means of the control airflow Fcnt. As a result, it is possible to achieve a favorable airflow adjustment effect.
(2) Adopting the plasma actuator 100 allows for generation of the control airflow Fcnt with favorable responsiveness by means of a simple and robust configuration having no movable part. As a result, it is possible to stably achieve the above-described airflow adjustment effect.
(3) Adopting the three-electrode plasma actuator 100 allows for generation of the control airflow Fcnt including a speed component in a direction away from the surface portion of the vehicle body by means of the single plasma actuator. As a result, it is possible to simplify the configuration of the airflow adjusting apparatus.
(4) Upon the low-speed traveling of the vehicle 1 in which it is easier for the airflow W to separate from the surface of the vehicle body around the vehicle body, the speed component of the control airflow Fcnt in the direction away from the surface of the vehicle body may be increased, thereby guiding the separated airflow W to the direction away from the surface of the vehicle body. This contributes to preventing the airflow W from being reattached to the surface of the bonnet 21 and thereby suppressing generation of a turbulent flow accompanied by a vortex flow. In contrast, upon the high-speed traveling of the vehicle 1 in which it is more difficult for the airflow W to separate from the surface of the vehicle body, the control airflow Fcnt that flows along the surface of the vehicle body may be generated. This accelerates the airflow W along the surface of the vehicle body, and thereby contributes to suppressing separation of the airflow W from the surface of the vehicle body. This also contributes to facilitating generation of the laminar flow along the surface of the vehicle body.
(5) The generation of the turbulent flow on the surface portion of the bonnet 21 and in the cowl 27 due to variation in a factor such as presence or absence of separation of the airflow W or a degree of the separation of the airflow W is allowed to be suppressed in accordance with the variation in a factor such as the traveling speed of the vehicle 1. This contributes to reduction in air resistance with respect to the vehicle 1 and also contributes to suppression of deterioration in aerodynamic noise and aerodynamic vibration. As a result, it is possible to improve driving stability.

An airflow adjusting apparatus according to another example embodiment of the technology is described below.

Second Example Embodiment

Figure 8:
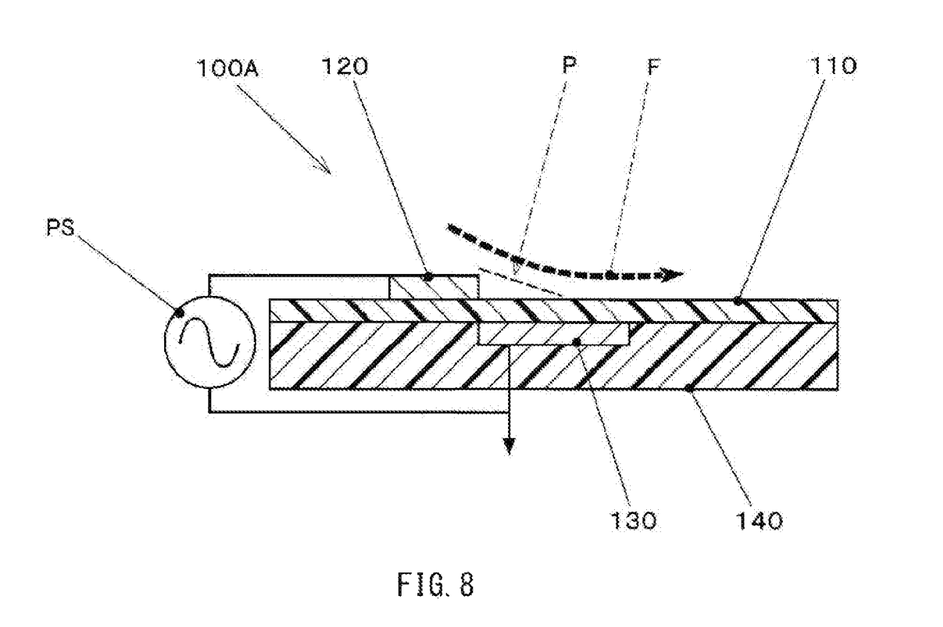
FIG. 8 is a schematic cross-sectional view of an example of a two-electrode plasma actuator included in an airflow adjusting apparatus according to one example embodiment of the technology.

FIG. 8 is a schematic cross-sectional view of a two-electrode plasma actuator 100A included in an airflow adjusting apparatus according to a second example embodiment of the technology. The airflow adjusting apparatus according to the second example embodiment is different from the airflow adjusting apparatus according to the first example embodiment in that the two-electrode plasma actuator 100A which will be described later may be adopted instead of the three-electrode plasma actuator 100. According to the second example embodiment, a pair of two-electrode plasma actuators 100A may be so disposed on the surface of the vehicle body as to be opposed to each other. In other words, the two-electrode plasma actuators 100A may be so disposed that airflows F generated by the respective plasma actuators 100A are opposed to each other. The pair of plasma actuators 100A having the same structure may be mirror-symmetrically disposed in the second example embodiment. However, adoptable plasma actuators are not limited thereto. In one example embodiment, a pair of plasma actuators having different outputs may be adopted. In one embodiment, the pair of plasma actuators 100A may serve as the "airflow generator".

Referring to FIG. 8, the two-electrode plasma actuators 100A may each include: the dielectric 110; the upper electrode 120 provided on the outer surface side of the dielectric 110; and the lower electrode 130 provided on the inner surface side of the dielectric 110. The upper electrode 120 may be provided on only one side of the lower electrode 130. The inner surface of the dielectric 110 and the lower electrode 130 may be covered with the insulator 140. The two-electrode plasma actuators 100A may each apply an alternating-current voltage between the upper electrode 120 and the lower electrode 130 by means of the power supply PS to thereby generate the airflow F that flows along the surface of the dielectric 110. According to the second example embodiment, the pair of plasma actuators 100A may be so disposed on the front portion of the bonnet 21 that flow directions of the respective airflows F are opposite to each other and the airflows F are opposed to each other in the vehicle front-rear direction. In one embodiment, the plasma actuator 100A disposed on the vehicle front side may serve as a "first plasma actuator", and the plasma actuator 100A disposed on the vehicle rear side may serve as a "second plasma actuator". In one embodiment, the dielectric 110, the upper electrode 120, the lower electrode 130, and the power supply PS included in the plasma actuator 100A disposed on the vehicle front side may serve as a "first dielectric", a "first upper electrode", a "first lower electrode", and a "first power supply", respectively. In one embodiment, the dielectric 110, the upper electrode 120, the lower electrode 130, and the power supply PS included in the plasma actuator 100A disposed on the vehicle rear side may serve as a "second dielectric", a "second upper electrode", a "second lower electrode", and a "second power supply", respectively.

Figure 9:
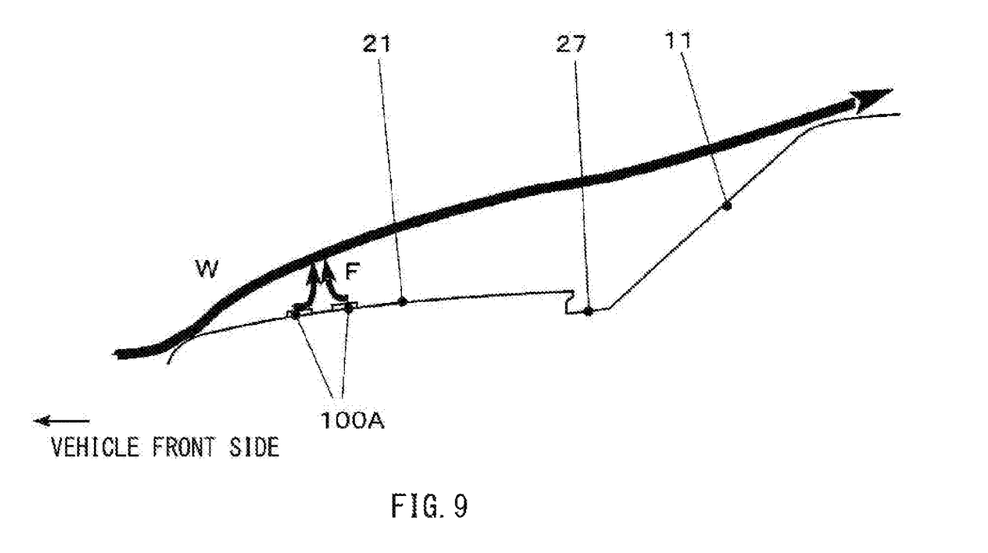
FIG. 9 is a diagram schematically illustrating an example of airflow behavior above a bonnet according to one example embodiment in a case where a vehicle is traveling at a low speed.
Figure 10:
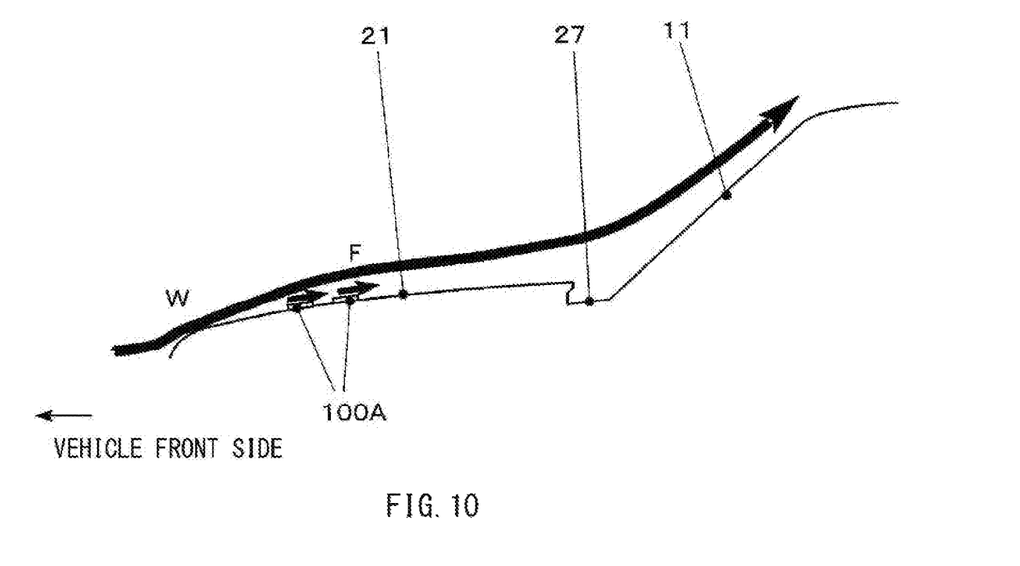
FIG. 10 is a diagram schematically illustrating an example of airflow behavior above the bonnet according to one example embodiment in a case where the vehicle is traveling at a high speed.

FIG. 9 and FIG. 10 each schematically illustrate airflow behavior above the bonnet 21 according to the second example embodiment. FIG. 9 illustrates a low-speed state where the vehicle is traveling at a low speed, for example, at a vehicle speed of 40 km/h. FIG. 10 illustrates a high-speed state where the vehicle is traveling at a high speed, for example, at a vehicle speed of 160 km/h.

In the low-speed state illustrated in FIG. 9, the plasma actuators 110A disposed on the vehicle front side and the vehicle rear side may generate the respective airflows F that are opposed to each other and cause the airflows F to interfere with or crash each other, thereby generating the upward control airflow Fcnt corresponding to that in the state illustrated in FIG. 6 according to the first example embodiment. According to the second example embodiment, the plasma actuator 100A disposed on the vehicle front side and the plasma actuator 100A disposed on the vehicle rear side may have respective outputs that are equal to or approximately equal to each other, thereby generating the control airflow Fcnt that flows in a direction perpendicular to the surface of the vehicle body. However, in one example embodiment, the plasma actuator 100A disposed on the vehicle front side may have an output greater than that of the plasma actuator 100A disposed on the vehicle rear side, thereby generating a control airflow Fcnt that flows in a direction having an acute angle with respect to the surface of vehicle body as with the state illustrated FIG. 6.

In the high-speed state illustrated in FIG. 10, the plasma actuators 100A may generate the respective airflows F that flow along the surface of the vehicle body toward the vehicle rear side, thereby generating the control airflow Fcnt along the surface of the vehicle body corresponding to that in the state illustrated in FIG. 7 according to the first example embodiment.

The second example embodiment described above also makes it possible to achieve effects similar to those of the first example embodiment excluding the effect described in (3).

In addition, a configuration combining the typical two-electrode plasma actuators 100A each having a simple structure allows for easier obtainment, for example, of parts of the airflow adjusting apparatus. This allows for easier application of one embodiment of the technology.

According to the airflow adjusting apparatus according to an embodiment of the technology, it is possible to generate an appropriate control airflow for an around-vehicle airflow, which is an airflow around a vehicle body of a traveling vehicle, on the basis of a state of the around-vehicle airflow, and to thereby achieve a favorable flow adjustment effect.

(Modifications)

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

(1) The configurations of the airflow adjusting apparatus and the vehicle are not limited to those described in the example embodiments above, and may be appropriately changed. For example, a shape of the vehicle and an installation position of the airflow adjusting apparatus may be appropriately changed.

(2) According to each of the example embodiments described above, the plasma actuator serving as the airflow generator of the airflow adjusting apparatus may be provided on the bonnet, for example. However, an installation position of the airflow generator is not limited thereto. For example, the installation position of the airflow generator may be appropriately changed to a location such as a roof, a trunk lid of a three-box vehicle, a fender, a door panel, or a bumper. In one example embodiment, the airflow generator may be provided on each window as long as a field of view is secured. In one example embodiment, the airflow generator may be provided on a protruding portion or a protruding curved portion on the vehicle rear side where it is easier for an airflow to separate from the surface of the vehicle body. This allows for control of the separated airflow.

(3) According to each of the example embodiments described above, the flow direction of the airflow is varied in accordance with the traveling speed of the vehicle, however, this is non-limiting. In one example embodiment, the flow direction of the airflow may be varied on the basis of any other index that represents the state of the airflow around the vehicle body. In one example embodiment, one or more pressure sensors may be disposed on the surface of the vehicle body to estimate a state or behavior of the airflow around the vehicle body, and the flow direction of the control airflow may be varied on the basis of a result of the estimation. In one example embodiment, the state of the airflow may be detected by means of a device other than the pressure sensor, such as a Doppler radar.

Each of the power supply unit 210 (e.g., a driving circuit in the power supply unit 210) and the airflow adjustment control unit 220 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the power supply unit 210 (e.g., the driving circuit in the power supply unit 210) and the airflow adjustment control unit 220 illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the power supply unit 210 (e.g., the driving circuit in the power supply unit 210) and the airflow adjustment control unit 220 illustrated in FIG. 3.

What is claimed is:

1. An airflow adjusting apparatus comprising:
an airflow generator configured to generate a control airflow to cause the control airflow to join an around-vehicle airflow formed around a vehicle body of a traveling vehicle, the airflow generator being configured to vary a flow direction of the control airflow with respect to a surface of the vehicle body;

a state detector configured to detect a state of the around-vehicle airflow; and a controller configured to vary the flow direction of the control airflow on a basis of the state of the around-vehicle airflow detected by the state detector, wherein the state detector is configured to detect a traveling speed of the vehicle, the controller is configured to increase a speed component, of the control airflow, that flows in a direction away from the surface of the vehicle body, in accordance with a decrease in the traveling speed.

2. The airflow adjusting apparatus according to claim 1, wherein the airflow generator includes a plasma actuator, the plasma actuator including a dielectric, a first upper electrode that is provided on a first surface portion of the dielectric, a second upper electrode that is provided on the first surface portion of the dielectric and is separated away from the first upper electrode along a surface of the first surface portion in a flow direction of the around-vehicle airflow, a lower electrode that is provided on a second surface portion of the dielectric, and a power supply configured to perform application of an alternating-current voltage between the first upper electrode and the lower electrode and application of an alternating-current voltage between the second upper electrode and the lower electrode independently of each other, and the controller is configured to control the power supply.

3. The airflow adjusting apparatus according to claim 1, wherein the airflow generator includes a first plasma actuator and a second plasma actuator that are separated away from each other along the surface of the vehicle body in a flow direction of the around-vehicle airflow, the first plasma actuator and the second plasma actuator being configured to induce respective airflows that are opposed to each other, the first plasma actuator includes a first dielectric, a first upper electrode that is provided on a first surface portion of the first dielectric, a first lower electrode that is provided on a second surface portion of the first dielectric, and a first power supply configured to apply an alternating-current voltage between the first upper electrode and the first lower electrode, the second plasma actuator includes a second dielectric, a second upper electrode that is provided on a first surface portion of the second dielectric, a second lower electrode that is provided on a second surface portion of the second dielectric, and a second power supply configured to apply an alternating-current voltage between the second upper electrode and the second lower electrode, and the controller is configured to control each of the first power supply and the second power supply.

4. The airflow adjusting apparatus according to claim 2, wherein the state detector is configured to detect a traveling speed of the vehicle, the controller is configured to increase a speed component, of the control airflow, that flows in a direction away from the surface of the vehicle body, in accordance with a decrease in the traveling speed.

5. The airflow adjusting apparatus according to claim 3, wherein the state detector is configured to detect a traveling speed of the vehicle, the controller is configured to increase a speed component, of the control airflow, that flows in a direction away from the surface of the vehicle body, in accordance with a decrease in the traveling speed.

6. The airflow adjusting apparatus according to claim 1, wherein the airflow generator is provided on an upper surface of a bonnet of the vehicle body.

7. The airflow adjusting apparatus according to claim 2, wherein the airflow generator is provided on an upper surface of a bonnet of the vehicle body.

8. The airflow adjusting apparatus according to claim 3, wherein the airflow generator is provided on an upper surface of a bonnet of the vehicle body.

9. The airflow adjusting apparatus according to claim 1, wherein the airflow generator is provided on an upper surface of a bonnet of the vehicle body.

10. The airflow adjusting apparatus according to claim 4, wherein the airflow generator is provided on an upper surface of a bonnet of the vehicle body.

11. The airflow adjusting apparatus according to claim 5, wherein the airflow generator is provided on an upper surface of a bonnet of the vehicle body.

* * * * *